May 30, 1961     H. D. EPSTEIN     2,986,685

OVERLOAD PROTECTIVE APPARATUS

Filed March 16, 1959

Henry David Epstein,
Inventor.
Koenig and Pope,
Attorneys.

United States Patent Office 2,986,685
Patented May 30, 1961

2,986,685

OVERLOAD PROTECTIVE APPARATUS

Henry David Epstein, Cambridge, Mass., assignor to Texas Instruments Incorporated, Dallas, Tex., a corporation of Delaware Filed Mar. 16, 1959, Ser. No. 799,682

7 Claims. (Cl. 318—221)

This invention relates to overload protective apparatus, and more particularly to overload protectors for electric motors.

Among the several objects of this invention may be noted the provision of overload protective apparatus which will effectively protect electric motors against all types of overload conditions, including both locked rotor and running overload types; the provision of such apparatus which is reliable in operation and has a minimum of components and complexity; the provision of apparatus of the class described in which the thermostatic element thereof has a prolonged "off" time; the provision of such protective apparatus in which the thermostatic element may have a relatively high electrical resistance; and the provision of overload protective apparatus having heating and cooling characteristics which substantially match those of the electric motor which it protects. Other objects and features will be in part apparent and in part pointed out hereinafter.

The invention accordingly comprises the constructions hereinafter described, the scope of the invention being indicated in the following claims.

Figure 1:
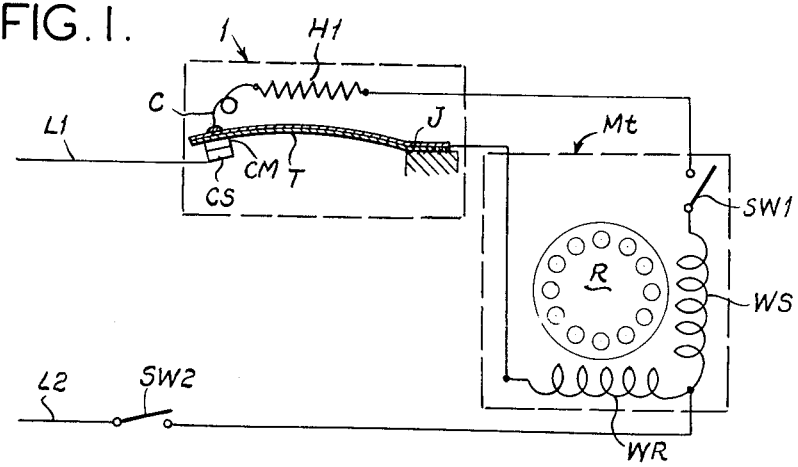
Figure 2:
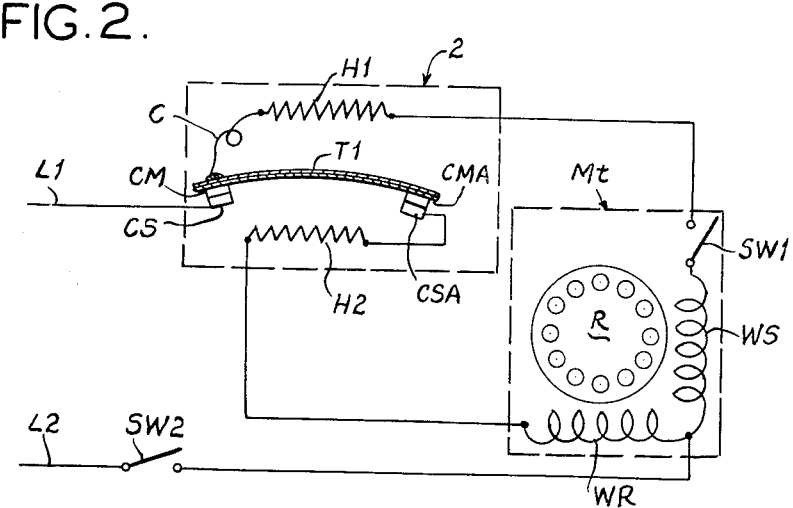

In the accompanying drawings, in which several of various possible embodiments of the invention are illustrated, Fig. 1 is a schematic circuit diagram of one embodiment of the overload protective apparatus of the present invention electrically interconnected with an electric motor; and, Fig. 2 is a schematic circuit diagram of an alternate embodiment of the present invention electrically interconnected with an electric motor.

Corresponding reference characters indicate corresponding parts throughout the several views of the drawings.

In the design and construction of overload protective apparatus for electric motors, particularly of the split-phase type, it is difficult to match the heating and cooling characteristics of the relatively small overload protective apparatus to that of the bulky motor. It is especially difficult to construct such protective apparatus which will be actuated practically instantaneously to open the motor circuit in response to motor faults which cause rapid rises of motor winding tmeperatures (e.g., a locked rotor condition), and still have a sufficient cooling or "off" time to avoid reclosing the circuit before the temperature of the windings falls to approximately the same temperature as that of the protective apparatus. For example, if the protective apparatus has a temperature-time cooling characteristic that decreases more rapidly than that of the windings themselves, the temperature of the windings will be higher than that of the protective apparatus at the time the latter recloses. If the motor fault continues, the automatic opening and reclosing of the apparatus effects thermal integration of the motor winding temperature; i.e., the temperature of the motor windings will be incrementally increased during each cycle of protector operation and eventually exceed a safe level, even though the overload protective apparatus continues to function at its predetermined operating or opening temperature and its predetermined reclosing or reset temperature. Also, it is frequently desirable to avoid the use of the thermostatic element of such a protective device as a common path for the load currents of both the start and run windings. In accordance with the present invention, overload protective apparatus is provided which has temperature-time characteristics which substantially match those of the motor with which it is associated, and the load current for the start winding does not traverse the thermostatic element thereof. By certain novel features of the construction, the cooling rate of my protective apparatus is decreased so that under locked rotor conditions, for example, thermal integration of the motor winding temperature is avoided.

Referring now to Fig. 1, an A.C. motor of the split-phase type is generally indicated at reference character Mt, and includes a conventional auxiliary or start winding WS and a main or run winding WR associated with a rotor R. A switch SW1 is connected in series with winding WS. Switch SW1 may be of any conventional type, such as the customary centrifugal type switch or an electromagnetic relay responsive to current flowing in run winding WR, either of which will open only after the motor comes up to running speeds. One side of each of these windings is commonly connected through a line switch SW2 to a terminal L2 of an A.C. power source. The other side of the start winding WS (via SW1) is electrically connected to an electrical heater unit H1, positioned in heat-exchange or transfer relationship with a thermostatic element T. The other terminal of H1 is connected by means of a permanent heat-conductive flexible connection C to element T. A movable electrical contact CM is affixed to element T at the point of connection of C to element T. The other side of the run winding WR is connected to thermostatic element T at an electrical junction J which is preferably a welded permanent connection. The electrical circuit to the other side of the A.C. power source (line terminal L1) is completed through contact CM and a registering stationary contact CS. The components included in the box in Fig. 1, and generally indicated at reference numeral 1, constitute an overload protective apparatus.

Thermostatic element T may be any element of bonded-together high-and-low thermal expansion layers, which is electrically conductive. Preferably it is a bimetallic snap-acting disc having a layer of high expansion metal or metallic alloy bonded to another layer of dissimilar metal having a lower coefficient of thermal expansion. Such thermostatic discs, having a predetermined operating temperature which when exceeded will cause a sudden reversal of curvature of the disc from the position shown in Fig. 1 to actuate contact CM and separate it from CS, are well known to those skilled in the art. An exemplary thermostatic element of this type incorporated in a thermostatic switch is described in detail in U.S. Patent 2,199,383. This type of thermostatic element is of the automatic reset type and will, upon its temperature decreasing below a predetermined temperature, reclose contact CM against contact CS.

Operation is as follows:

Under normal operating conditions thermostatic element T is positioned as shown in Fig. 1 and the flow of starting current through H1 and running current through T does not generate enough heat to raise the temperature of T above its operating level. Assuming an overload, such as a locked rotor condition, the load current drawn by WS and WR would rise very rapidly and heat the windings WS and WR. The heat generated by the I²R loss in H1 and the I²R loss in T, due to the excessive start and run winding currents respectively, would raise the temperatureé of T substantially instantaneously to a level exceeding its operating temperature, thereupon causing T to be actuated and by cantilever action from junction J causing contact CM to disengage contact CS. This current-breaking action deenergizes motor Mt and element T will cool to its reset temperature and reclose. However, the cooling rate of element T is decreased, inasmuch as the permanent heat-conducting flexible connection C continues to transfer heat conductively from H1 during periods when contact CM is separated or spaced from contact CS. Thus, the cooling rate of thermostatic disc T is decreased by this construction and will delay the reclosing of contacts CM and CS so that the characteristic time-temperature curve of T will closely match that of motor Mt, which of course has a much greater physical mass and, normally, a poor coefficient of heat transfer. During the periods when CM and CS are engaged, heat is transferred not only conductively to element T from heating unit H1 as described above, but also radiantly and convectively because of the close physical proximity. This radiant and convective heat transfer between T and H1 is enhanced when element T is in its "off" position because it is moved closer to H1 in this position.

It will be noted that only the current for the run winding WR traverses the electrical path through element T between junction J and contact CM, thereby causing self-heating of T in response solely to run winding current. Thus, the electrical resistance of this current path is not so critical nor does it need to be minimized to avoid the heat variation which would result if T carried the additive currents of both motor windings.

Overload protective apparatus 1 may or may not be positioned in heat exchange relationship with motor Mt, i.e., mounted on the motor housing or associated with the motor windings. If it is so positioned the element T would be responsive not only to the self-heating effect of the run winding current through T, and the heat generated by H1, but also to the heat transferred from the windings WR and WS. During running overloads, such as an alternate trip condition (i.e., where an essentially constant motor load is of such a level that it would eventually cause the motor winding temperature to rise above a predetermined safe level), which cause a more gradual rate of temperature rises, the temperature rise element T due to the self-heating and the heat transferred from the winding to thermostatic element T is sufficiently rapid so that there is little temperature differential between T and the windings of motor Mt. It will be noted that during such running overloads, switch SW1 and H1 are not energized.

It can be seen, therefore, that this apparatus of Fig. 1 operates to protect the motor against overloads of all types, and that if the overload fault is not rectified element T will continue to cycle between open and closed positions, intermittently deenergizing and reenergizing motor Mt, but because of the decreased cooling rate of T excessive motor winding temperatures will be avoided. Also, it is seen that the current of the start winding bypasses the thermostatic element T and does not contribute to the self-heating of this element.

The embodiment of Fig. 2 is generally similar to that of Fig. 1, both in construction and operation. However, instead of a single break type thermostatic element T, a double break snap-acting thermostatic disc T1 is utilized. Also, a second electrical heater H2 is serially connected between a second stationary contact CSA and winding WR. To complete the electrical circuit from L2 to L1 through WR and H2 a second contact CMA is provided which is positioned in registry and normally engages contact CSA. Thus, the temperature of disc T1 is a function of the heat transferred from both H1 and H2 as well as of the self-heating effect due to the I²R loss of the run current through T1. Moreover, if the overload protective apparatus of this embodiment, generally indicated at reference numeral 2, is located on the housing or windings of motor Mt, disc T also senses this heat. Again as in Fig. 1, the thermostatic element T1 will continue to have heat transferred to it conductively while in its circuit-open position and thereby have a desirable decreased cooling rate approximating that of the motor windings.

It is to be understood that the heating units H1 and H2 may be of any physical configuration of electrically resistant material, such as a flat or wavy strip, a helix, etc.

In view of the above, it will be seen that the several objects of the invention are achieved and other advantages results attained.

As various changes could be made in the above constructions without departing from the scope of the invention, it is intended that all matter contained in the above description or shown in the accompanying drawings shall be interpreted as illustrative and not in a limiting sense.

I claim:

1. Overload protective apparatus for an electric motor having start and run windings, a stationary contact connected to one terminal of a source of electric power, an electrically conductive thermostatic element having a movable contact affixed thereto and adapted normally to engage said stationary contact, one of said windings being series-connected between a second power source terminal and a point on said thermostatic element spaced from said movable contact, and an electrical heater unit having a permanent heat-conductive flexible electrical connection with said movable contact and series-connected with the other of said windings between said movable contact and said second power source terminal, said heating unit being positioned in heat-exchange relationship with said thermostatic element and adapted to heat said element in response to the current drawn by said one winding, said element having a predetermined operating temperature which when exceeded will actuate said element to move said movable contact away from said stationary contact and simultaneously open the circuits of both windings, whereby heat will continue to be transferred conductively from said heating unit through said flexible connection to said thermostatic element while said contacts are separated and thereby decrease the cooling rate of said element.

2. Overload protective apparatus as set forth in claim 1 in which the thermostatic element is snap-acting and is positioned in heat-exchange relationship with said motor windings.

3. Overload protective apparatus as set forth in claim 1 which further includes a second electrical heater unit serially connected in said series circuit with said one winding and also positioned in heat-exchange relationship with said element, whereby said element is heated in response to the currents drawn by said start and run windings respectively.

4. Overload protective apparatus as set forth in claim 3 in which the thermostatic element is snap-acting and is positioned in heat-exchange relationship with said motor windings.

5. Overload protective apparatus for an electric motor having start and run windings, comprising an electrically conductive thermostatic element having first and second spaced-apart movable electrical contacts affixed thereto, a first stationary contact connected to a source of electrical power and adapted normally to be engaged by said first movable contact, and an electrical heater unit having a permanent heat-conductive flexible electrical connection with said first movable contact and series-connected with said start winding between said first movable contact and said power source, a second stationary contact adapted normally to be engaged by said second movable contact, said run winding being connected between said second stationary contact and said power source, said heating unit being positioned in heat-exchange relationship with said thermostatic element and adapted to heat said element in response to the current drawn by said start winding, said element having a predetermined operating temperature which when exceded will actuate said element to move said movable contacts away from said stationary contacts and simultaneously open the circuits of both windings, whereby heat will continue to be transferred conductively from said heating unit through said flexible connection to said thermostatic element while said contacts are separated and thereby decrease the cooling rate of said element.

6. Overload protective apparatus as set forth in claim 5 which further includes a second heating unit serially connected between said second stationary contact and said run winding and positioned in heat-exchange relationship with said element.

7. Overload protective apparatus as set forth in claim 5 in which the thermostatic element is positioned in heat-exchange relationship with said motor windings.

References Cited in the file of this patent

UNITED STATES PATENTS

| | | |
|---|---|---|
| 1,997,673 | Boothby | Apr. 16, 1935 |
| 2,338,515 | Johns | Jan. 4, 1944 |
| 2,876,311 | Ellenberger | Mar. 3, 1959 |
| 2,881,378 | Russell | Apr. 7, 1959 |